United States Patent Office 2,740,771
Patented Apr. 3, 1956

2,740,771
VINYL ESTER COPOLYMERS

Raymond I. Longley, Jr., and Earl C. Chapin, Springfield, and Richard F. Smith, Ludlow, Mass., assignors to Monsanto Chemical Company, St. Louis, Mo., a corporation of Delaware No Drawing. Application December 20, 1954,
Serial No. 476,552

6 Claims. (Cl. 260—85.7)

This invention relates to new copolymers. More particularly, the invention relates to copolymers of vinyl esters and 2-butene-1,4-diol.

2-butene-1,4-diol is an unsaturated glycol having the following formula:

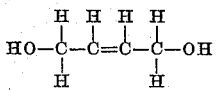

It exists in both cis and trans forms, neither of which is polymerizable under normal polymerization conditions. For many purposes, it is desirable to obtain low molecular weight polymers of this compound because such polymers contain primary hydroxyl groups along the chains.

One object of this invention is to provide copolymers of 2-butene-1,4-diol.

Another object of this invention is to provide copolymers having a substantial number of primary hydroxyl groups therein.

These and other objects are attained by copolymerizing a vinyl ester with 2-butene-1,4-diol at elevated temperatures and pressures.

The following examples are given in illustration and are not intended as limitations on the scope of this invention. Where parts are mentioned, they are parts by weight.

Example I

Mix together 90 parts of vinyl acetate, 10 parts of 2-butene-1,4-diol, 8 parts of butanol and 3 parts of ditertiary butyl peroxide in a pressure vessel and purge the air above the mixture with pure nitrogen. Close the vessel and heat it at 180° C. for about 1 hour. Then cool, release the pressure and distill the product under a vacuum at about 200° C. The residue, after removing volatile material, is a yellow viscous oil containing about 1.25% hydroxyl groups by weight. It is readily soluble in butanol, methanol, dimethyl formamide, acetone and xylene.

Example II

Mix together 80 parts of vinyl acetate, 20 parts of 2-butene-1,4-diol, 20 parts of n-butanol and 3 parts of ditertiary butyl peroxide and heat the mixture in a closed vessel in the substantial absence of oxygen for about 1 hour at 180° C. Vacuum distill the resulting mixture at 200° C. and 3 mm. pressure. The residual product obtained is a yellow viscous oil containing about 4.6% hydroxyl groups by weight. The oil is soluble in alcohols, ketones, dimethyl formamide and aromatic hydrocarbons.

Example III

Mix together 70 parts of vinyl acetate, 30 parts of 2-butene-1,4-diol, 20 parts of n-butanol and 3 parts of ditertiary butyl peroxide. Heat the mixture in the absence of oxygen under autogenous pressure at 180° C. for about 1.5 hours and distill at 200° C. under 3 mm. vacuum. The residual product is a light brown viscous polymer containing about 5.5% hydroxyl groups by weight. It is soluble in alcohol, ketones, aromatic hydrocarbons and dimethyl formamide.

Substantially equivalent results may be obtained by substituting one or more of the other vinyl esters for some or all of the vinyl ester in the examples. The esters should be vinyl esters of saturated unsubstituted aliphatic acids and the ester groups may contain up to about 20 carbon atoms. Among the vinyl esters which may be used are vinyl formate, propionate, butyrate, 2-ethyl hexoate, laurate, stearate, arachidate, etc.

The amount of vinyl ester to be used will depend on the amount of hydroxyl groups desired in the final polymer. In general, it is possible to obtain copolymers having from 1 to 15% hydroxyl groups by weight by varying the weight ratio of vinyl ester to 2-butene-1,4-diol between 90:10 and 10:90.

In order to prepare the copolymers of this invention, the reaction should be carried out in the absence of oxygen at temperatures of from 100 to 250° C. under at least autogenous pressure, i. e., the pressure developed by the reactive ingredients in a closed vessel at the reaction temperature. Under these conditions, conversions of up to 50% are obtained in from 1 to 2 hours. The reaction may be speeded up somewhat and higher conversions may be obtained by carrying out the reaction at much higher pressures, i. e., up to about 3000 atmospheres.

The vinyl ester monomers and the butenediol monomer are not miscible so that some difficulty arises in preparing a homogeneous copolymer. This difficulty may be solved in at least two ways. One is to operate at relatively high pressures which seem to overcome the immiscibility of the monomers. Another is to use a mutual solvent for the monomers such as the butanol of the examples. Other solvents such as ethanol, propanols, butanols, pentanols, beta-alkoxy ethanols, acetone, methylethyl ketone, etc. may be used.

The reaction requires the presence of a free-radical producing agent which is stable enough at the temperatures used to allow proper control of the reaction. Among the best of these is ditertiary butyl peroxide. Other catalysts which may be used are benzoyl peroxide, t-butyl perbenzoate, pinacolone peroxide, etc. The amount of initiator may be varied between 0.1 and 5 parts per 100 parts of total monomer.

The copolymers of this invention are particularly useful as reactive plasticizers or components of various synthetic resins such as phenolic resins, melamine resins, urea resins, epoxy resins, alkyd resins, etc.

What is claimed is:

1. A copolymer of a vinyl ester of an aliphatic unsubstituted acid containing from 1 to 20 carbon atoms and 2-butene-1,4-diol, said copolymer containing from 1 to 15% hydroxyl groups by weight.

2. A copolymer of vinyl acetate and 2-butene-1,4-diol, said copolymer containing from 1 to 15% hydroxyl groups by weight.

3. A copolymer of vinyl acetate and 2-butene-1,4-diol, said copolymer containing about 5.5% hydroxyl groups by weight.

4. A process for preparing copolymers of 2-butene-1,4-diol and a vinyl ester of an aliphatic unsubstituted carboxylic acid containing from 1 to 20 carbon atoms, said process comprising polymerizing a mixture of the butenediol and the vinyl ester in the absence of oxygen under pressure at a temperature of from 100 to 250° C. in the presence of a free radical producing initiator.

5. A process as in claim 4 wherein the vinyl ester is vinyl acetate.

6. A process as in claim 5 wherein the pressure is autogenous pressure.

No references cited.